US007139727B1

(12) United States Patent
Pierce et al.

(10) Patent No.: US 7,139,727 B1
(45) Date of Patent: Nov. 21, 2006

(54) METHOD AND SYSTEM FOR OPTIMIZING MARKET ACCESSIBILITY VIA AN ELECTRONIC NETWORK

(75) Inventors: Jerry E. Pierce, Winter Park, FL (US); Bradley E. Pierce, Casselberry, FL (US)

(73) Assignee: Woodbine Leasing, Inc., Orlando, FL (US)

( * ) Notice: Subject to any disclaimer, the term of this patent is extended or adjusted under 35 U.S.C. 154(b) by 0 days.

(21) Appl. No.: 09/497,773

(22) Filed: Feb. 3, 2000

(51) Int. Cl.
*G06F 17/60* (2006.01)

(52) U.S. Cl. .......................................... 705/26; 705/27
(58) Field of Classification Search ................. 705/27, 705/26
See application file for complete search history.

(56) References Cited

U.S. PATENT DOCUMENTS

| 5,946,665 | A  | * | 8/1999  | Suzuki et al. ................. 705/26 |
| 6,138,158 | A  | * | 10/2000 | Boyle et al. ................. 709/225 |
| 6,247,047 | B1 | * | 6/2001  | Wolff ......................... 709/219 |
| 6,338,059 | B1 | * | 1/2002  | Fields et al. .................... 707/4 |
| 6,401,118 | B1 | * | 6/2002  | Thomas ....................... 709/224 |

FOREIGN PATENT DOCUMENTS

KR   99068686   *   9/1999

OTHER PUBLICATIONS www.archive.org search of www.go.com.*
www.archive.org search of www.abc.go.com.*
www.archive.org search of www.espn.go.com.*
www.archive.org search of www.movie.go.com.*
www.fox.com, Dec. 30, 1996.*
www.foxsports.com, Apr. 22, 1999.*
Register.com reports for "foxnews.com", "foxsports.com" and "foxtv.com".*
www.nycrestaurant.com, Oct. 8, 1999.*
www.nycvisit.com, Jan. 10, 1998.*
www.sonyclassical.com, dated May 8, 1999.*
www.sonymusic.com, dated May 7, 1999.*

(Continued)

*Primary Examiner*—Michael Cuff
(74) *Attorney, Agent, or Firm*—Toler, Larson & Abel, LLP

(57) ABSTRACT

A method for marketing a plurality of products or services includes the steps of selecting an arbitrary word and appending the arbitrary word to a first and a second product- or service-related word to create a first and a second site name. Each of the first and the second words is descriptive of a product or a service desired to be offered. The method also includes the step of establishing a first and a second electronic site. Each site is accessible via an electronic communications network, and each site offers at least one product or service describable by one of the first and second words. Next a linkage is created between the respective site names and the electronic sites. This linkage permits a user to access an electronic site with the use of the respective site name.

16 Claims, 2 Drawing Sheets

OTHER PUBLICATIONS

Iwww.thestore.sonymusic.com, dated Feb. 3, 1999.* www.sonynashville.com, dated Apr. 28, 1999.*

Lewis, Kent "A Banner Year For Advertising", Online Magazine, Oct. 3, 2000, 2 pages, [Online] Retrieved from the Internet May 30, 2003, at URL <http://www.anvil-media.com/rachives/100300/banner.htm.>.

Jackson, Jerry W. "Web marketing stirs up sales for restaurant-gear vendor", Orlando Sentinel Newspaper, Jan. 31, 2002, 2 pages, Orlando Sentinel, Orlando, Florida, U.S.A.

Roberts, Stan "Pots, Pans 'N Profits", Small Business Opportunities Magazine, Jan. 2003, 3 pages, 15th Anniversary Issue, Harris Publications, Inc., New York, U.S.A.

Kelson, Allen "Smart Dealer Tricks", Food Service Equipment and Supplies Magazine, Sep. 2000, 4 pages [Online] Retrieved from the Internet Nov. 12, 2002, at URL <http://www.restaurantequipment.net/press/fesarticle0900.html>.

Ward, Stacy "Competing with Goliath", Foodservice Equipment Distributors Association Journal, May/Jun. 2000, 6 pages, Foodservice Equipment Distributors Association, Chicago, U.S.A.

Waddle, Lisa "Focusing on niche brought online success", Online Magazine, Jan./Feb. 2001, 2 pages [Online] Retrieved from the Internet Nov. 12, 2002 at URL <http://www.restaurantequipment.net/press/mybusinessmagzine-jan2001.html>, Hammock Publishing.

* cited by examiner

METHOD AND SYSTEM FOR OPTIMIZING MARKET ACCESSIBILITY VIA AN ELECTRONIC NETWORK

BACKGROUND OF THE INVENTION

1. Field of the Invention

The present invention relates to electronic commerce systems and methods, and, more particularly, to such systems and methods that improve a potential customer's likelihood of reaching a particular electronic commerce site.

2. Description of Related Art

In electronics communications systems, such as the Internet, it is known to have commercial venues, known as "web sites," or simply "sites," that are hosted by a vendor and typically offer a product or range of products for sale. A potential customer may locate a particular site by any of a number of methods, including entering an exact domain name of the site that is either known in advance or guessed at from a known trademark of the product desired and/or its manufacturer.

Alternatively, a search engine may be used to locate a vendor of the product desired. This method can be, however, singularly unsatisfying, as a search based upon a common word will often yield hundreds of search "hits," most of which turn out to be fruitless owing to facetious or frivolous linkages established by an owner or builder of the site. Ferreting out a useful connection can be extremely time-consuming and frustrating, often leading the user to abandon the search entirely and choose a low-tech purchasing option, or to turn to a site already known just because of ease and familiarity. In either of these cases, a vendor that does not enjoy widespread name recognition from long-term existence or from having spent prodigiously on advertising will likely lose out on a possible sale. In fact, it has been the subject of widespread reports that even a large marketing budget does not confer immunity from financial woes, as witnessed by the recent spate of falling stock prices in the e-commerce arena among the so-called "dot-com's."

SUMMARY OF THE INVENTION

It is therefore an object of the present invention to provide a system and method for increasing the likelihood that a potential customer will locate a vendor via an electronic communications network.

It is an additional object to provide such a system and method for establishing a plurality of interrelated electronic vendor locations that are adapted to be easily identifiable and locatable.

It is a further object to provide such a plurality of interrelated electronic vendor locations.

It is another object to provide a system and method of offering for sale a plurality of related products or services.

It is also an object to provide such a system and method the accessibility of which obviates the need for large expenditures on marketing a product or service.

These objects and others are attained by the present invention, a system and method for marketing a plurality of products or services. The method comprises the steps of selecting an arbitrary word and appending the arbitrary word to a first and a second product- or service-related word to create a first and a second site name. Each of the first and the second words is descriptive of a product or a service desired to be offered.

The method also comprises the step of establishing a first and a second electronic site. Each site is accessible via an electronic communications network, and each site offers at least one product or service describable by one of the first and second words. Next a linkage is created between the respective site names and the electronic sites. This linkage permits a user to access an electronic site with the use of the respective site name.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
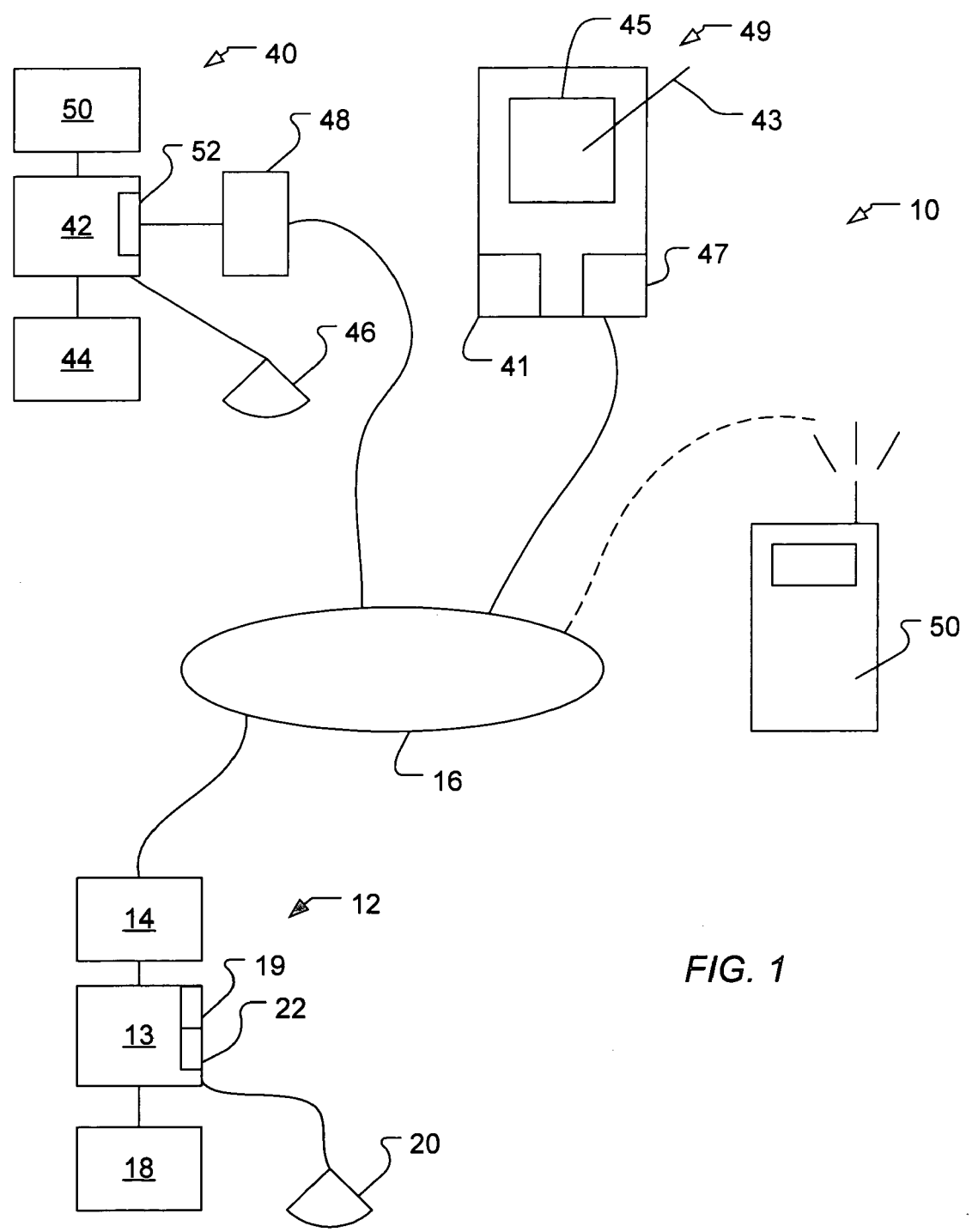
FIG. 1 is a schematic diagram of the system of the present invention.
Figure 2:
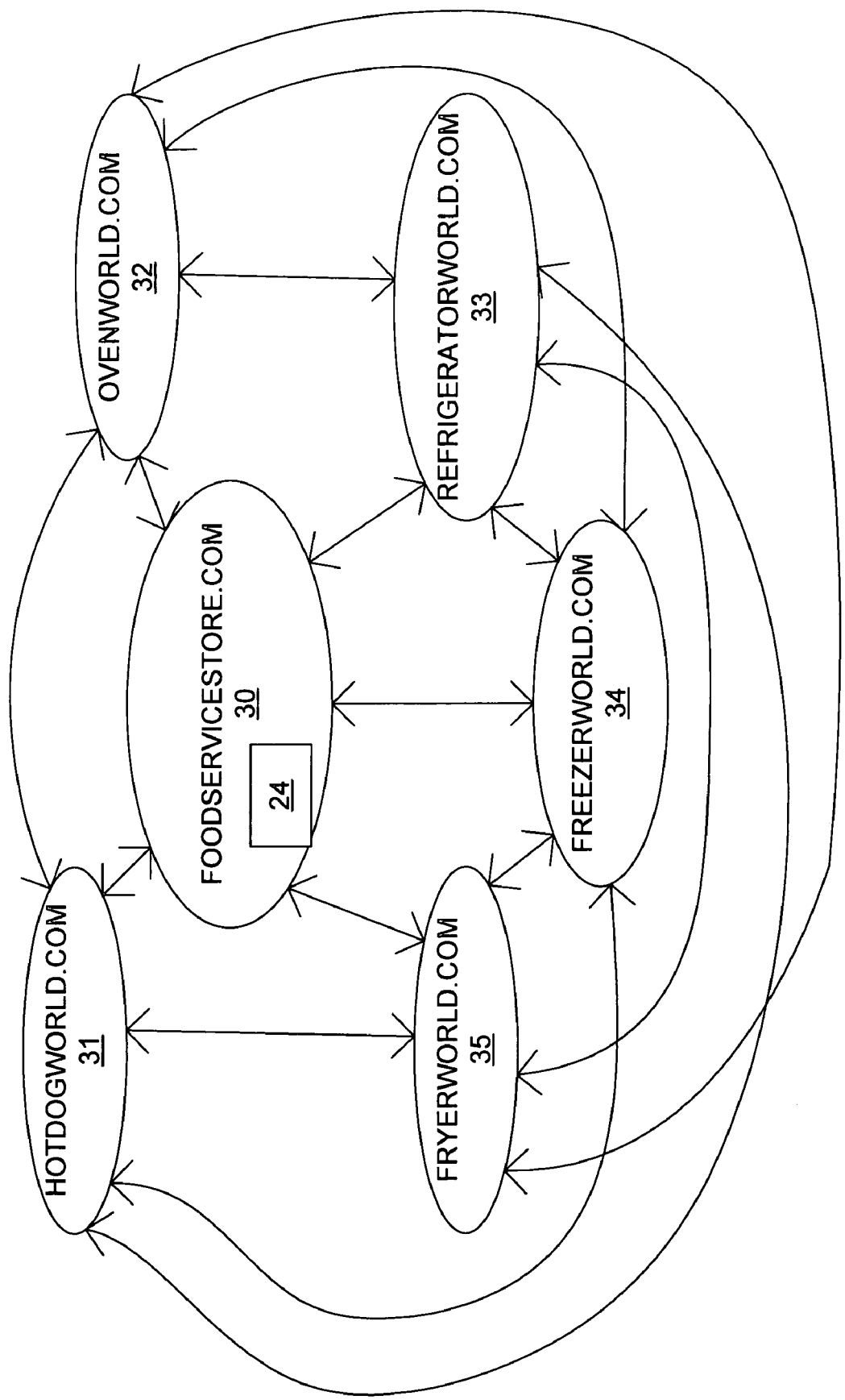
FIG. 2 is a schematic diagram of the virtual site connectivity.

A description of the preferred embodiments of the present invention will now be presented with reference to FIGS. 1 and 2.

A schematic diagram of the system 10 of the present invention (FIG. 1) includes a host computer 12 in electronic communication via modem 14 with a network, such as the Internet 16. The host computer 12 includes a processor 13 in electronic communication with input devices, which may include devices such as a keyboard 18, speech recognition hardware and software 19, and/or a pointing device such as a mouse 20, and a software package 22 adapted to perform the necessary site-building task.

The host 12 uses the software 22 to build a plurality of interrelated and interconnected sites 31–35 (FIG. 2), all also linked to a central site 30, on which may be resident service routines 24 for such tasks known in the art as taking orders, processing payment, verifying credit cards, confirming orders, and querying buyers. These routines are not intended to be limiting, and one of skill in the art will recognize additional routines that could be included herein; alternatively, some of these tasks may be performed manually.

The sites 30–35 illustrated in FIG. 2 are representative of but a small portion of the potential and realized embodiments of the invention for ease of visualization. Each of the sites 30–35 contains a so-called "hot link" to all the other sites. In the embodiment illustrated, a central site, "FoodServiceStore.com" 30 comprises the central processing host utilities and also hot links to the other product-specific sites, here shown as "Hotdogworld.com" 31, "Ovenworld.com" 32, "Refrigeratorworld.com" 33, "Freezerworld.com" 34, and "Fryerworld.com" 35. As can be seen, all these illustrative satellite sites 31–35 comprise product-specific sites for restaurant equipment, and were created with the software 22 to set up the sites 31–35 and name them, here by appending the arbitrary word "world" to a product-specific word descriptive of the site, e.g., "Refrigeratorworld.com." The sites 31–35 are also registered by name.

Returning to FIG. 1, a potential buyer has a computer system 40, including a processor 42 in electronic communication with a keyboard 44, a mouse 46, a modem 48, and a display screen 50. Other input devices such as touch screens and voice recognition equipment may be used. Alternatively, a potential buyer may utilize a device known in the art as a "personal digital assistant," or PDA 49, which includes a processor 41, pointing device 43, a touch screen 45, and modem 47. Cellular technology 50 is also being developed in the art that will enable communication with the system of the present invention. The processor 42 has resident thereon software 52 for connecting with the Internet. Once a potential buyer understands that information can be obtained using such equipment 40 connected to the Internet, it becomes a simple matter to try to find sites having information on a desired product or service by appending an arbitrary word, here "world," to a name of a product or service.

Although the sites 31–35 illustrated herein relate to specific products, it may be seen by one of skill in the art that other product lines and services could be offered. For example, a set of linked sites providing legal services could be envisioned, for example, by appending the arbitrary word "law" to a specialty area, yielding "Divorcelaw.com," "Securitieslaw.com," and "Patentlaw.com." It can be seen that the invention has virtually limitless possibilities in simplifying a user's search options, saving time and effort.

It should be noted that by "arbitrary word" may be construed any symbol, letter, or sequence of letters, not necessarily a recognized English word, that may or may not comprise a pronounceable syllable or plurality of syllables. For example, the unpronounceable sequence of letters "xyz" may comprise such a "word," as would be a nonword such as "skool." A single letter may also be used, for example, a "z" in place of an "s," such as "toolz.com" or "toyz.com." Further, an entire phrase could be employed, such as "to go," as in "pizzatogo.com" or "burgerstogo.com." Additionally, a symbol such as "@" might be used, such as in "shop@home.com" or "work@home.com." One of skill in the art will recognize that it is the concept of appending a symbol, letter, or sequence of letters to a product- or service-related word that is a particular feature of the invention.

It should also be noted that by "appending" may be construed placing the arbitrary "word" as a prefix or as a suffix to the product- or service-related word. In this way one might construct related sites such as "travelamerica.com" or "traveleurope.com."

Since the product-related sites are also all "hot linked" together, it is also a simple matter to navigate between them. For example, once a user has obtained the desired information on a freezer in site 34, he can scan a list of hotlinks if he needs another piece of equipment, such as an oven, whence he would select site 32, which would navigate him to that site 32.

It may be appreciated by one skilled in the art that additional embodiments may be contemplated, including alternate systems and method for accessing sites with names developed as disclosed herein.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

The invention claimed is:

1. A method of offering a plurality of interrelated products through a plurality of interrelated websites, the method comprising:
   establishing a first website having a first website domain name the first website domain name including a first second-level domain name portion formed from a common name portion, a first product name portion, and a top-level domain portion, the first product name portion identifying a first product of the plurality of interrelated products offered for sale via the first website, the first product offered as part of a product family, the first website accessible via an electronic communications network;
   establishing a second website having a second website domain name, the second website domain name including a second second-level domain name portion formed from the common name portion, a second product name portion, and the top-level domain portion, the second product name portion identifying a second product of the plurality of interrelated products offered for sale via the second website wherein the second product is related to the first product, the second website separately accessible via the electronic communications network;
   creating a website direct link between the first website and the second website, such that a user visiting the first website can move to the second website by selecting the direct link;
   establishing a third website having a third website domain name, the third website domain name including a third second-level domain name portion formed from the common name portion, a third product name portion, and the top-level domain portion, the third product name portion identifying a third product of the plurality of interrelated products offered for sale via the third website wherein the third product is related to the first product and is related to the second product, the third website is separately accessible via the electronic communications network; and
   wherein the first website includes the direct link to the second website and includes a second direct link to the third website, the second website includes a third direct link to the first website and fourth direct link to the third website, and the third website includes a fifth direct link to the first website and a sixth direct link to the second website.

2. The method of claim 1, wherein a central site processes payments, verifies credit cards, confirms product orders, and queries visitors to the first website and to the second website.

3. The method of claim 1, wherein the first website, the second website, and a central site are associated with restaurant equipment.

4. The method of claim 1, wherein the first website, the second website, and a central site are interrelated electronic vendor sites.

5. A method of offering a plurality of interrelated products through a plurality of interrelated websites, the method comprising:
   establishing a first website having a first website domain name, the first website domain name including a first second-level domain name portion formed from a common name portion, a first product name portion, and a top-level domain portion, the first product name portion describing a first product of the plurality of interrelated products offered for sale via the first website, the first website accessible via an electronic communications network;

establishing a second website having a second website domain name, the second website domain name including a second second-level domain name portion formed from the common name portion, a second product name portion, and the top-level domain portion, the second product name portion describing a second product of the plurality of interrelated products offered for sale via the second website wherein the second product is related to the first product, the second website separately accessible via the electronic communications network;

establishing a third website having a third website domain name, the third website domain name including a third second-level domain name portion formed from the common name portion, a third product name portion, and the top-level domain portion, the third product name portion describing a third product of the plurality of interrelated products offered for sale via the third website wherein the third product is related to the first product and is related to the second product, and wherein the third website is separately accessible via the electronic communications network; and wherein the first website includes a direct link to the second website and includes a second direct link to the third website, the second website includes a third direct link to the first website and a fourth direct link to the third website, and the third website includes a fifth direct link to the first website and a sixth direct link to the second website.

6. The method of claim 5, wherein the at least one common commerce related service task includes taking electronic orders for the first product, the second product, and the third product.

7. The method of claim 5, wherein a central site includes a hotlink to each of the first website, the second website, and the third website.

8. The method of claim 5, wherein the first product, the second product, and the third product are interrelated products offered by a vendor.

9. The method of claim 5, wherein the first website, the second website, the third website and a central site are associated with restaurant equipment.

10. The method of claim 5, wherein the first website, the second website, the third website and a central site are interrelated electronic vendor sites.

11. A method of offering a plurality of interrelated services through a plurality of interrelated websites, the method comprising:

establishing a first website having a first website domain name, the first website domain name including a first second-level domain name portion formed from a common name portion, a first service name portion, and a top-level domain portion, the first service name portion describing a first service of the plurality of interrelated services identified via the first website, the first website accessible via an electronic communications network;

establishing a second website having a second website domain name, the second website domain name including a second second-level domain name portion formed from the common name portion, a second service name portion, and the top-level domain portion, the second service name portion describing a second service of the plurality of interrelated services identified via the second website wherein the second service is related to the first service, the second website separately accessible via the electronic communications network;

establishing a third website having a third website domain name, the third website domain name including a third second-level domain name portion formed from the common name portion, a third service name portion, and the top-level domain portion, the third service name portion describing a third service of the plurality of interrelated services wherein the third service is related to the first service and is related to the second service, and wherein the third website is separately accessible via the electronic communications network; and wherein the first website includes a direct link to the second website and includes a second direct link to the third website, the second website includes a third direct link to the first website and a fourth direct link to the third website, and the third website includes a fifth direct link to the first website and a sixth direct link to the second website.

12. The method of claim 11, wherein a central site includes a hotlink to each of the first website, the second website, and the third website.

13. The method of claim 11, wherein the first service, the second service, and the third service are interrelated products offered by a vendor.

14. The method of claim 11, wherein the first website, the second website, the third website and a central site are associated with restaurant equipment.

15. The method of claim 11, wherein the first website, the second website, the third website and a central site are interrelated electronic vendor sites.

16. The method of claim 11, wherein the at least one common service task includes taking electronic orders for the first product, the second product, and the third product.

* * * * *